United States Patent
McNeil et al.

(10) Patent No.: US 12,319,611 B2
(45) Date of Patent: *Jun. 3, 2025

(54) WATER-REPELLENT-FILM-ATTACHED GLASS ARTICLE AND METHOD FOR MANUFACTURING SAME

(71) Applicant: Nippon Sheet Glass Company, Limited, Tokyo (JP)

(72) Inventors: Patricia Elena McNeil, Los Angeles, CA (US); Yoko Watanabe, Hyogo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 18/015,693

(22) PCT Filed: Jul. 13, 2021

(86) PCT No.: PCT/JP2021/026351
§ 371 (c)(1),
(2) Date: Jan. 11, 2023

(87) PCT Pub. No.: WO2022/014607
PCT Pub. Date: Jan. 20, 2022

(65) Prior Publication Data
US 2023/0192538 A1 Jun. 22, 2023

(30) Foreign Application Priority Data
Jul. 14, 2020 (JP) .................................. 2020-120945

(51) Int. Cl.
C03C 17/00 (2006.01)
C03C 17/25 (2006.01)
C03C 17/32 (2006.01)

(52) U.S. Cl.
CPC ............ *C03C 17/25* (2013.01); *C03C 17/008* (2013.01); *C03C 17/326* (2013.01);
(Continued)

(58) Field of Classification Search
None
See application file for complete search history.

(56) References Cited

U.S. PATENT DOCUMENTS

2009/0304996 A1* 12/2009 Kishikawa ................ B32B 5/16
428/141
2012/0021177 A1 1/2012 Kawai et al.
(Continued)

FOREIGN PATENT DOCUMENTS

EP 545347 A1 * 6/1993 ........... C03C 17/007
JP H01301517 A 12/1989
(Continued)

OTHER PUBLICATIONS

International Search Report and Written Opinion issued for International Patent Application No. PCT/JP2021/026351, Date of mailing: Oct. 12, 2021, 12 pages including English translation of Search Report.
(Continued)

*Primary Examiner* — Kim S. Horger
(74) *Attorney, Agent, or Firm* — HSML P.C.

(57) ABSTRACT

The present disclosure provides a glass substrate to which water repellency that is not lost by a heat treatment is imparted. Provided is a water-repellent-film-attached glass article including a glass substrate and a water-repellent film on the glass substrate. The water-repellent film includes cerium oxide, a contact angle of water on a surface of the water-repellent film is 75° or greater, and the contact angle is 75° or greater after the glass article is exposed to a thermal treatment at 760° C. for 4 minutes.

13 Claims, 1 Drawing Sheet

(52) U.S. Cl.
CPC .... *C03C 2217/228* (2013.01); *C03C 2217/76* (2013.01); *C03C 2217/77* (2013.01); *C03C 2218/31* (2013.01); *C03C 2218/32* (2013.01)

(56) References Cited

U.S. PATENT DOCUMENTS

| | | |
|---|---|---|
| 2012/0282458 A1 | 11/2012 | Takeda et al. |
| 2014/0004323 A1 | 1/2014 | Bockmeyer et al. |
| 2015/0152558 A1 | 6/2015 | Walther et al. |
| 2018/0050957 A1 | 2/2018 | Moncur et al. |
| 2020/0339772 A1 | 10/2020 | Taga |

FOREIGN PATENT DOCUMENTS

| | | |
|---|---|---|
| JP | H08104543 A | 4/1996 |
| JP | 2008119924 A | 5/2008 |
| JP | 2013543833 A | 12/2013 |
| JP | 2014500163 A | 1/2014 |
| JP | 2015116731 A | 6/2015 |
| JP | 2015140277 A | 8/2015 |
| JP | 2016183099 A | 10/2016 |
| JP | 2019123872 A | 7/2019 |
| JP | 2019151538 A | 9/2019 |
| WO | 2010007956 A1 | 1/2010 |
| WO | 2011090035 A1 | 7/2011 |
| WO | 2012061240 A1 | 5/2012 |
| WO | 2019142830 A1 | 7/2019 |

OTHER PUBLICATIONS

Extended European Search Report issued for European Patent Application No. 21841977.8, dated Jun. 24, 2024, 7 pages.

\* cited by examiner

WATER-REPELLENT-FILM-ATTACHED GLASS ARTICLE AND METHOD FOR MANUFACTURING SAME

TECHNICAL FIELD

The present invention relates to a water-repellent-film-attached glass article and a method of manufacturing the glass article.

BACKGROUND ART

Water-repellent films are sometimes formed on surfaces of glass substrates and other substrates. Water-repellent films are commonly formed by applying a water-repellent agent including a water-repellent organic substance, specifically, a fluorine-containing compound or a silicone-based compound. It has also been proposed to form a portion of a water-repellent film with an inorganic compound. For example, Patent Literature 1 discloses a water-repellent article including a substrate and a water-repellent film including a metal oxide particle layer and an overcoat layer in this order from the substrate side. The metal oxide particle layer has a surface having small irregularities, which improve the abrasion resistance or the like of the water repellency imparted by the overcoat layer. Although the oxide forming the metal oxide particles and used in examples is only $SiO_2$, $CeO_2$ and other oxides are also listed as examples. Overcoat layers used in the examples are formed of a hydrolysis polycondensation product of a hydrolyzable organic silicon compound.

Techniques for imparting water repellency without using an organic substance are also under study. For example, Patent Literature 2 discloses a technique for firing an oxide ceramic at 1600° C. for 5 hours in an atmosphere where the organic substance concentration and the moisture concentration are low to sinter the oxide ceramic and impart water repellency thereto. Rare-earth oxides such as $CeO_2$, aluminum oxide, and titanium oxide are shown as examples of the oxide forming the oxide ceramic.

CITATION LIST

Patent Literature

Patent Literature 1: JP 2015-116731 A
Patent Literature 2: JP 2015-140277 A

SUMMARY OF INVENTION

Technical Problem

Glass substrates are sometimes subjected to a treatment involving heating, and the heating temperature can be as high as several hundred degrees centigrade depending on the details of the treatment. The water repellency imparted by an organic substance is lost at such a high temperature. Contrarily, stable exhibition of the water repellency achieved according to Patent Literature 2 can be expected even at high temperatures. However, the technique according to Patent Literature 2 is for imparting water repellency to an oxide ceramic itself being a highly heat-resistant substrate and requires sintering at high temperatures. It is therefore difficult to apply the technique according to Patent Literature 2 to glass substrates. Heating at 1600° C. for 5 hours as disclosed in Patent Literature 2 at least makes common glass substrates too soft to keep their shapes as substrates and, in some cases, completely melts the glass substrates.

It is accordingly an object of the present invention to provide a glass substrate to which water repellency that is not lost by a heat treatment is imparted.

Solution to Problem

The present invention provides a water-repellent-film-attached glass article including:
a glass substrate; and
a water-repellent film on the glass substrate, wherein
the water-repellent film includes cerium oxide,
a contact angle of water on a surface of the water-repellent film is 75° or greater, and
the contact angle is 75° or greater after the glass article is exposed to a thermal treatment at 760° C. for 4 minutes.

In another aspect, the present invention provides a method for manufacturing a water-repellent-film-attached glass article, the method including:
applying a coating liquid containing cerium oxide as a solid onto a glass substrate to form a coating film on the glass substrate; and
drying the coating film to form a water-repellent film, wherein
the cerium oxide includes $CeO_2$.

Advantageous Effects of Invention

The present invention provides a glass substrate to which water repellency that is not lost by a heat treatment is imparted.

DESCRIPTION OF EMBODIMENTS

Figure 1:
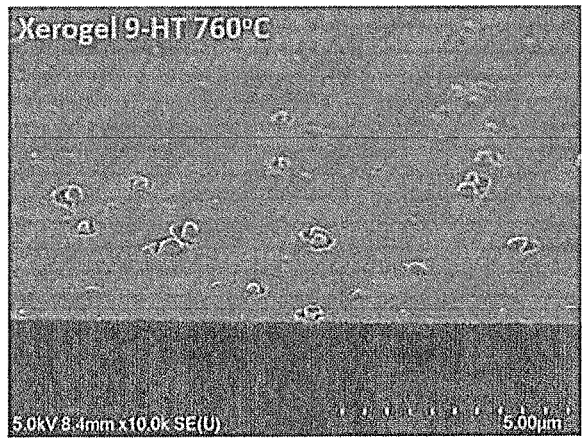
FIG. 1 shows the result of scanning electron microscope (SEM) observation of a water-repellent-film-attached glass article produced in Example 1.

The following description of embodiments of the present invention is not intended to limit the present invention to specific embodiments. The term "main component" as used herein means a component whose content is 50% or more, particularly 60% or more, on a mass basis. The phrase "substantially free" means that the content of a component is less than 1%, or even less than 0.1%. The phrase "substantially flat" means that other than fine particles and projecting portions in a fine particle shape on a surface, no irregularities having a height or depth of 500 nm or more are observed using a SEM. The term "ordinary temperature" is used as a term that means a temperature in the range of 5 to 35° C., particularly 10 to 30° C.

A water-repellent-film-attached glass article provided by the present embodiment includes:
a glass substrate; and
a water-repellent film on the glass substrate, wherein
the water-repellent film includes cerium oxide,
a contact angle of water on a surface of the water-repellent film is 75° or greater, and
the contact angle is 75° or greater after the glass article is exposed to a thermal treatment at 760° C. for 4 minutes.

A method provided by the present embodiment for manufacturing a water-repellent-film-attached glass article includes:

applying a coating liquid containing cerium oxide as a solid onto a glass substrate to form a coating film on the glass substrate; and drying the coating film to form a water-repellent film, wherein the cerium oxide includes $CeO_2$.

Unlike aluminum oxide, silicon oxide, and the like, cerium oxide can function as a water-repellent material. According to studies by the present inventor, the water repellency imparted by cerium oxide can be 75° or greater, 80° or greater, or even 85° or greater as expressed in terms of the water contact angle. The contact angle of such a magnitude has been conventionally achieved by means of a surface treatment using a water-repellent agent being an organic substance. The water-repellent agent being an organic substance is commonly decomposed in the process of heating to approximately 300° C. Cerium oxide, on the other hand, is stable even when heated to a higher temperature.

In the present embodiment, the water contact angle of the water-repellent-film-attached glass article exposed to the thermal treatment at 760° C. for 4 minutes can be 75° or greater, 80° or greater, or even 85° or greater. However, in the present embodiment, the contact angle of water on the surface of the water-repellent film may be measured after a while from the thermal treatment because the contact angle of water on the surface of the water-repellent film can decrease temporarily just after the thermal treatment. It takes several tens of days in some cases to recover the contact angle. Therefore, the above contact angle may be measured, for example, after the thermal treatment of the glass article at 760° C. for 4 minutes and storage of the glass article in air at ordinary temperature for 40 days.

Hereinafter, the glass substrate and the water-repellent film included in the water-repellent-film-attached glass article of the present embodiment will be described. Subsequently, properties that can be achieved by the present embodiment will be described, and, at the end, a manufacturing method of the present embodiment will be described.

(Glass Substrate)

The type of the glass forming the glass substrate is not particularly limited. The glass substrate may be formed of any of various glasses, such as soda-lime glass, borosilicate glass, aluminosilicate glass, alkali-free glass, and quartz glass. The glass substrate may include $SiO_2$ as its main component. The size and the shape of the glass substrate are not particularly limited, either. The glass substrate may be a glass sheet, a glass container, a glass lid, a glass tube, a glass bulb, a glass lens, a glass fiber, a glass filler, or another formed body. The glass container is, for example, a glass vial, a glass ampoule, or a glass bottle, and may have another shape such as the shape of a tray or a Petri dish. The shape of the glass lid is not particularly limited as long as the glass lid functions as a lid, and the glass lid may have a shape, for example, allowing the glass lid to be used as a lid of a cooking device. The glass fiber may be a long fiber or a short fiber. The glass filler may have, for example, a flaky shape.

The glass sheet may have the shape of a flat plate, or may have a curved shape achieved by a bending treatment. The thickness of the glass sheet is not particularly limited, and is, for example, 0.5 to 12 mm. The glass sheet may be treated so as to be suitable for use as window glass of buildings, vehicles, and the like. The glass sheet may be subjected to, for example, a reinforcement treatment. As the reinforcement treatment are known thermal tempering in which the glass sheet is rapidly cooled after heating to form a compressive stress layer on a surface of the glass sheet and chemical strengthening in which a compressive stress layer is formed on a surface of the glass sheet by ion exchange of alkali metal ions. The glass sheet may be integrated with another glass sheet by a lamination processing and/or a double-glazing processing. A film may be arranged on a surface of the glass sheet to impart or control properties other than the water repellency. Examples of the film include a conductive film, a reflection-reducing film, and a colored film. The colored film is, for example, a ceramic coating for providing a blackish frame to an edge of the glass sheet.

Many of the above treatments of glass sheets involve heating of the glass sheets. For example, the bending treatment of a glass sheet includes a step of softening the glass sheet by heating. In a lamination processing treatment and a double-glazing processing treatment as well as in the reinforcement treatment, glass sheets can be, in some cases, heated to high temperatures depending on the type of a resin film sandwiched by the glass sheets or the type of a sealant used to seal the space between the glass sheets. Water-repellent films exhibiting the water repellency attributed to an organic substance greatly decrease the water repellency through heating in such treatments. Because of this, water-repellent films exhibiting the water repellency attributed to an organic substance need to be formed after a treatment involving heating of glass sheets. Such a restriction on manufacturing steps can reduce the efficiency in mass production. For example, uniformly applying a coating liquid onto a curved surface is much more difficult than uniformly applying a coating liquid onto a surface of a flat plate. A step of applying a coating liquid onto a flat glass strip before cutting the flat glass strip and processing each of the resulting pieces to have a curved plane can be performed much more efficiently.

Such a water repellency decrease caused by a treatment involving heating can occur for not only glass sheets but also glass substrates in general. On the other hand, according to the present embodiment in which the water repellency is exhibited independent of an organic substance, a water repellency decrease caused by heating can be reduced. Hence, according to a method of the present embodiment, it is possible to subject the glass substrate to a wide variety of treatments, after the formation of the water-repellent film, in which the glass substrate having the water-repellent film thereon is heated. In the case of the glass sheet, the wide variety of treatments include, for example, at least one selected from the group consisting of a bending treatment (heat bending treatment), a thermal tempering treatment, a chemical strengthening treatment, a lamination processing treatment, a double-glazing processing treatment, and a coating formation treatment which involve heating, and are particularly a heat bending treatment and/or a thermal tempering treatment. That is, in the present embodiment, the glass substrate may be a glass sheet subjected to at least one treatment selected from the group consisting of a heat bending treatment and a thermal tempering treatment. The temperature set in the above thermal treatments is commonly, at most, approximately 760° C. or lower.

Conventionally, a glass sheet is subjected to a heat bending treatment and/or a thermal tempering after being cut into a given shape, and then a coating liquid for formation of a water-repellent film is applied to a principal surface of the glass sheet. Therefore, a portion of the coating liquid is attached to an edge face of the glass sheet and the water-repellent film is formed also on at least a portion of the edge face. On the other hand, according to the present embodiment, it is possible to form the water-repellent film by applying the coating liquid onto a principal surface of a flat-plate-shaped glass sheet and thereafter subject the glass sheet to at least one treatment selected from the group consisting of a heat bending treatment and a thermal tempering treatment. The glass sheet provided by this embodiment can be a glass sheet having the water-repellent film on at least one principal surface of the glass sheet, and not having the water-repellent film on an edge face of the glass sheet. The water-repellent film can be locally thick at the edge face where the coating liquid tends to stay. Therefore, avoidance of the formation of the water-repellent film being locally thick at the edge face is advantageous, for example, in ensuring a fine product appearance. In addition to such quality improvement, the glass sheet provided by this embodiment also contributes to reduction in end product cost because a coating treatment can be continuously applied to the uncut glass sheet having a large area.

(Water-Repellent Film)

The water-repellent film includes cerium oxide. The water-repellent film may have the cerium oxide as its main component. The water-repellent film may have a surface on which the cerium oxide is exposed. The cerium oxide preferably includes $CeO_2$, namely, an oxide of tetravalent cerium. $CeO_2$ is a more desirable component than $Ce_2O_3$, namely, an oxide of trivalent cerium, in terms of increasing the water repellency. However, the water-repellent film may include $Ce_2O_3$ as the cerium oxide. For example, in the case where a compound including trivalent cerium is used as a source of the cerium oxide and a portion thereof is oxidized to tetravalent cerium, the rest of the trivalent cerium is included as $Ce_2O_3$ in the water-repellent film together with $CeO_2$.

Water-repellent films on substrates formed of, for example, glass commonly have a multi-layer structure composed of a metal oxide layer serving as an underlayer and an overcoat layer formed of an organic compound (refer to Patent Literature 1). The overcoat layer is often formed of a hydrolysis polycondensation product of a hydrolyzable organic silicon compound so as to be firmly bonded to the metal oxide layer. The hydrolyzable organic silicon compound is an organic compound, typically a fluoroalkyl-containing compound, suitable for improvement of the water repellency. On the other hand, in the present embodiment, the water-repellent film may be substantially free of a hydrolysis polycondensation product of the hydrolyzable organic silicon compound. The water-repellent film may be substantially free of a fluoroalkyl-containing compound.

The water-repellent film may be a single-layer film or may be a multi-layer film formed of a plurality of layers. The water-repellent film being a single-layer film is advantageous in reducing mass production cost. Even when the water-repellent film of the present embodiment is a single-layer film, the water-repellent film can maintain its water repellency. When the water-repellent film of the present embodiment is a multi-layer film, the water-repellent film desirably includes a layer including the cerium oxide as a topmost layer of the multi-layer film.

The water-repellent film of the present embodiment can achieve a water contact angle of 75° or greater, even 80° or greater, 85° or greater, or, in some cases, 90° or greater. The upper limit of the water contact angle is not particularly limited, and is, for example, less than 110°, or even less than 100°. The water contact angle can be measured for 4 ml of pure water dropped onto the surface of the water-repellent film.

The water-repellent film of the present embodiment does not completely lose its water repellency even when heated to a high temperature, for example, to 500° C. or even 760° C. The water-repellent film of the present embodiment can achieve a water contact angle of 75° or greater, even 80° or greater, 85° or greater, or, in some cases, 90° or greater, for example, even after the glass article is exposed to the thermal treatment at 760° C. for 4 minutes.

Although the details of the reason are unknown, the water repellency of the water-repellent film of the present embodiment can temporarily decrease after the water-repellent film is heated at a high temperature. Moreover, a water repellency value can be unstable shortly after the formation of the film and a low value can be shown then. However, even in such cases, just by storing the water-repellent film in air at ordinary temperature, the water contact angle gradually increases and becomes stable, and the contact angle as described above is achieved. According to studies by the present inventor, a period of time required for recovery and stabilization of the contact angle is about 30 to 40 days. Therefore, the contact angle of the water-repellent film having undergone the thermal treatment at a high temperature is desirably measured after storage in air at ordinary temperature for a given period of time.

The water-repellent film may include an organic component. The organic component may be an organic compound, or may be an organic group bonded to, for example, an oxide forming the film. The content of the organic component in the water-repellent film is not particularly limited. The content of the organic component in the water-repellent film may be 0.01% or more or even 0.1% or more on a mass basis, and may be 10% or less or even 1% or less on a mass basis. The content of the organic component can be relatively large in the water-repellent film not exposed to the thermal treatment at a high temperature. However, the water-repellent film may be substantially free of the organic component.

The organic group included in the water-repellent film may include an epoxy group. The epoxy group is a preferred functional group suitable for use in a later-described example of manufacturing of the water-repellent film. As described later, the epoxy group is consumed by a reaction with another component, specifically, an acid. However, the epoxy group can remain in the water-repellent film when added excessively. The epoxy group remaining in the water-repellent film functions as a crosslinking agent particularly in the thermal treatment and can affect the structure of the film.

The water-repellent film may include an inorganic compound other than the cerium oxide. Examples of the oxide other than the cerium oxide can include silicon oxide, aluminum oxide, zirconium oxide, titanium oxide, ruthenium oxide, and oxides of rare earths other than cerium. The inorganic compound may be other than an oxide, and may be, for example, a nitride, a carbide, or the like.

The water-repellent film has a thickness of, for example, 5 to 1000 nm. The thickness of the water-repellent film may be 10 nm or more, and may be 500 nm or less or even 200 nm or less.

The water-repellent film may have a dense structure, or may have a pore inside. A porosity of the water-repellent film may be, for example, 20% or more, 25% or more, 30% or more, or, in some cases, 40% or more, and may be 85% or less, 70% or less, 60% or less, or, in some cases, 50% or less. The water-repellent film having an appropriate porosity can have excellent optical properties. Specifically, control of the porosity can achieve elimination of an interference color that can be exhibited by the water-repellent film, improvement of the visible transmittance and the reflectance, and the like.

Small irregularities represented by the following measures may be arranged on the surface of the water-repellent film. An arithmetic mean roughness Ra may be 1 nm or more, 2 nm or more, even 3 nm or more, or, in some cases, 10 nm or more, and may be 50 nm or less, 40 nm or less, even 30 nm or less, or, in some cases, 25 nm or less. A ten-point mean roughness RzJIS may be 20 nm or more, even 50 nm or more, 100 nm or more, or even 200 nm or more, and may be 500 nm or less, 400 nm or less, or even 300 nm or less. Here, Ra is an arithmetic mean roughness defined in Japanese Industrial Standards (JIS) B 0601:2013, and RzJIS is a ten-point mean roughness defined in JIS B 0601:2001. The water-repellent film having appropriate small irregularities can have a further improved water repellency, for example, because the small irregularities affect the surface tension of a water drop in contact with the small irregularities.

The water-repellent film may have a plurality of fine particles on the surface. The fine particles may be fine cerium oxide particles. In other words, a portion of the cerium oxide included in the water-repellent film may be included in the form of fine particles exposed on the surface of the film. The surface of the water-repellent film may be substantially flat. As described above, whether the surface of the water-repellent film is substantially flat or not is judged by the flatness of the surface excluding the fine particles, that is, by excluding the irregularities provided by the fine particles. The particle diameter of the fine cerium oxide particle may be 100 nm to 1.5 μm or even 250 nm to 1 μm. The particle diameter of the fine particle can be measured by SEM observation. The fine particles having the above particle diameter may be present on the surface of the water-repellent film at a density of 1 to 100 particles or even 2 to 20 particles in a 5 μm$^2$ area of the film surface. The presence of the fine particles can contribute to improvement of the water repellency through development of the small irregularities.

The crystallite size of the fine cerium oxide particle included in the water-repellent film is not particularly limited, and may be, for example, 1 to 100 nm or even 2 to 20 nm.

(Properties)

The water repellency the glass article of the present embodiment can provide is as described above. In addition to this, the glass article of the present embodiment can have, for example, the following optical properties. A visible transmittance of the glass article may be 70% or more, 80% or more, or even 85% or more. The upper limit of the visible transmittance is not particularly limited, and is, for example, 95%. A visible reflectance of the glass article may be 20% or less, 15% or less, 10% or less, or even 8% or less. The lower limit of the visible reflectance is not particularly limited, and is, for example, 2%. The visible reflectance refers to a visible reflectance at the surface on which the water-repellent film is arranged. In other words, the visible reflectance refers to a reflectance of visible light coming from the outside of the glass article through the water-repellent film and reaching to the glass substrate. A haze ratio of the glass article is, for example, 20% or less, and is preferably 10% or less, even 5% or less, or particularly 4% or less.

The preferred ranges of the visible transmittance, the visible reflectance, and the haze ratio are as follows. More preferred ranges thereof are shown in the parentheses.

Visible transmittance: 80% to 95% (85% to 95%)
Haze ratio: 5% or less (4% or less)
Visible reflectance of the surface of the glass substrate on which the water-repellent film is arranged: 2 to 20% (2% to 8%)

(Manufacturing Method)

Next, a method for manufacturing the glass article of the present embodiment will be described. However, the glass article of the present embodiment may be manufactured by a method other than the following manufacturing methods.

The manufacturing method of the present embodiment includes: applying a coating liquid containing cerium oxide as a solid onto the glass substrate to form a coating film on the glass substrate; and drying the coating film. The cerium oxide includes $CeO_2$. It should be noted that the cerium oxide as a solid is not necessarily present as a complete oxide as long as cerium oxide is supplied to the water-repellent film. The term "cerium oxide" as a solid includes a cerium oxyhydroxide and a cerium hydroxide that can supply cerium oxide after dehydration condensation.

This manufacturing method may further include preparing the coating liquid. The coating liquid may contain a polar solvent, particularly a lower alcohol having 5 or less carbon atoms, as a solvent. The lower alcohol may be methanol and/or ethanol. The step of preparing the coating liquid may include hydrolysis of a cerium compound including trivalent cerium. The hydrolyzable cerium compound is preferably a compound soluble in the polar solvent, and, specifically, may be selected from water-soluble cerium compounds. The cerium compound may be, for example, at least one selected from the group consisting of a halogenated cerium and cerium nitrate. The halogenated cerium is, for example, cerium (III) chloride or cerium (III) bromide. The cerium compound is preferably a compound of trivalent cerium, as described above as examples including cerium (III) nitrate. However, the cerium compound is not limited to the compound of trivalent cerium, and may include tetravalent cerium.

In a common sol-gel process, an acid or an alkali is added to a coating liquid to accelerate hydrolysis of a metal compound. In the manufacturing method of the present embodiment, an acid or an alkali may be added, too. However, a more preferred additive is an organic compound functioning as an acid scavenger, and is specifically an epoxy-containing organic compound, particularly a water-soluble epoxide. The water-soluble epoxide is an epoxy-containing compound having a solubility of 1 g/100 ml or more in water at 20° C. The water-soluble epoxide may be a monofunctional epoxide or a polyfunctional epoxide. The monofunctional water-soluble epoxide may be, for example, an epoxy-containing alkane such as propylene oxide (1,2-epoxypropane) or 1,2-epoxybutane, glycidyl ether of a lauryl alcohol EO adduct, glycidyl ether of a phenol EO adduct, or the like. The polyfunctional water-soluble epoxide is, for example, glycerol polyglycidyl ether, polyglycerol diglycidyl ether, or sorbitol polyglycidyl ether.

As described above, in the manufacturing method of the present embodiment, the cerium compound preferably undergoes hydrolysis under the presence of the water-soluble epoxide. The hydrolysis of the cerium compound under the presence of the water-soluble epoxide results in consumption of an acid generated by the hydrolysis of the cerium compound, accelerating the hydrolysis reaction. Moreover, in the coating liquid to which the water-soluble epoxide is excessively added, tetravalent cerium is more likely to be yielded from trivalent cerium. This phenomenon is thought to be due to improvement of the stability of tetravalent cerium in a range at a high pH.

The prepared coating liquid is applied onto the glass substrate. The coating liquid is applied, for example, by a known method such as spin coating, bar coating, spray coating, nozzle flow coating, or roll coating.

The manufacturing method of the present embodiment may further include subjecting the coating film to at least one treatment selected from washing and drying. The coating film formed by the application and still in a wet state includes, together with the cerium oxide, the organic compound, such as the water-soluble epoxide and a product resulting from a ring-opening reaction thereof, contained in the coating liquid. At least a portion of the organic compound in the coating film in a wet state is removed from the coating film by a treatment which is washing and/or drying, particularly, by washing. An organic solvent, particularly, a polar organic solvent having 5 or less carbon atoms, is suitable as a solvent used in the washing. One preferred example of the washing is performed using a lower alcohol and a ketone sequentially. The lower alcohol is, as described above, an alcohol having 5 or less carbon atoms. The ketone is preferably a ketone having 7 or less, 5 or less, or even 3 or less carbon atoms. By the removal of the organic compound, pores are formed in the dried water-repellent film, and small irregularities can be formed on the surface of the dried water-repellent film. The porosity and the sizes of the small irregularities can be controlled, for example, by the amount of the organic compound. The manufacturing method described above as an example is particularly suitable for forming a water-repellent film having a desired porosity and desired small irregularities.

The above-described oxidation of trivalent cerium to tetravalent cerium requires time in some cases. Therefore, the manufacturing method of the present embodiment may further include holding at least one selected from the coating liquid and the coating film in a wet state just for a given period of time. This step can be performed, for example, by holding at least one selected from the prepared coating liquid and the coating film in a wet state at a temperature of 5 to 80° C. for 0.5 to 48 hours. This step allows what is called "aging" of the coating liquid or the coating film to take place, increasing the rate of tetravalent cerium. A preferred aging target is the coating liquid. For example, for the coating liquid, a color attributed to tetravalent cerium starts to be observed as conversion to tetravalent cerium progresses. The coating liquid containing only trivalent cerium is colorless if not containing another material that causes coloring. Typically, the coating liquid can be colored a brownish color first and then a yellowish color as more tetravalent cerium is generated. In order to generate a sufficient amount of tetravalent cerium during the period of holding, the pH of the coating liquid is desirably maintained so as not to be too low. For example, the amount of the water-soluble epoxide functioning as an acid scavenger is appropriately adjusted to control the pH.

The process of generation of tetravalent cerium can be monitored in absorption spectra from an ultraviolet region to a visible region. For example, an absorption edge of the coating liquid in the ultraviolet region shifts to the long wavelength region side as more tetravalent cerium is generated. When the aging continues until this absorption edge shifts to be in a region of, for example, 350 nm or more, particularly 360 nm or more, a sufficient amount of tetravalent cerium to form the water-repellent film is generated.

The preferred amount of the water-soluble epoxide depends on, for example, the type of the water-soluble epoxide. When the water-soluble epoxide is propylene oxide, a mixing ratio between cerium (III) included in the cerium compound and propylene oxide may be, in a molar ratio, 1:10 to 1:90, 1:15 to 1:80, even 1:20 to 1:70, particularly 1:25 to 1:50.

The epoxy-containing organic compound such as the water-soluble epoxide may be further supplied after the hydrolysis of the cerium compound. The supply of the epoxy-containing organic compound may also achieve washing of the film. The supply of the epoxy-containing organic compound to the film after the hydrolysis can contribute to early stabilization of the water contact angle after the film formation. The supply of the epoxy-containing organic compound after the hydrolysis can also contribute to improvement of the water contact angle after the thermal treatment.

The manufacturing method of the present embodiment may further include subjecting the glass substrate to a treatment involving heating after the formation of the water-repellent film on the glass substrate. The treatment involving heating is at least one selected from the group consisting of the above examples, and is particularly a heat bending treatment and/or a thermal tempering treatment. It should be noted that the glass substrate of the present embodiment can be used without these treatments.

(Other Manufacturing Methods)

A water-repellent-film-attached glass article of the present embodiment is not limited to one manufactured by the method described above as an example and involving the hydrolysis of the cerium compound. The water-repellent-film-attached glass article of the present embodiment can be manufactured, for example, by a reduced-pressure film formation method typified by sputtering.

Hereinafter, the present invention will be described in more detail with reference to examples. The following examples are not intended to limit the present invention to specific embodiments.

First, methods for measuring properties will be described.

(Porosity)

Optical parameters of films were determined by spectral analysis of reflected light using an ellipsometer (DVA-FL manufactured by Mizojiri Optical Co., Ltd.). For the determination, the laminate structure of a water-repellent-film-attached glass sheet was defined as consisting of a glass sheet (refractive index: 1.52) and a water-repellent film (refractive index: 2.2, in the case where the porosity is 0). The refractive index and the thickness of the water-repellent film were calculated by fitting, and the porosity thereof was calculated.

(Optical Properties)

The visible transmittance and the visible reflectance were determined from a visible-ultraviolet absorption spectrum measured using a spectrophotometer (330 manufactured by Hitachi, Ltd.). The haze ratio was measured using a haze meter (HZ-V3 manufactured by Suga Test Instruments Co., Ltd.).

(Water Contact Angle)

An amount of 4 mg of purified water was dropped onto a surface of each water-repellent film using a contact angle measurement apparatus (DMs-401 manufactured by Kyowa Interface Science Co., Ltd.) to measure a water contact angle. It should be noted that the formed water-repellent film was left in air at ordinary temperature for 20 days before the measurement of the water contact angle. A water contact angle after a thermal treatment was measured after each water-repellent-film-attached glass sheet having undergone the thermal treatment was left in air at ordinary temperature for 40 days.

(Surface Profile of Film)

The arithmetic mean roughness Ra in JIS B 0601:2013 and the ten-point mean roughness RzJIS in JIS B 0601:2001 were calculated on the basis of a surface height profile in a 5 µm$^2$ field of view, the surface height profile being obtained using an atomic force microscope (SPA-400 manufactured by former SII NANOTECHNOLOGY INC.).

(Thermal Treatment)

Each water-repellent-film-attached glass sheet was heated in an electric furnace set at 760° C. for 4 minutes, taken out of the furnace, wrapped in ceramic wool, and then cooled to room temperature at a cooling rate at which heat cracking does not occur. The water contact angle, etc. were measured after the thermal treatment, too.

Example 1

An amount of 0.168 g of cerium (III) chloride heptahydrate (manufactured by Sigma-Aldrich Co., LLC.; 99.9%) was dissolved in 2 mL of anhydrous methanol (manufactured by Sigma-Aldrich Co., LLC.) to obtain a colorless, transparent cerium (III) chloride solution. This solution contains 9.6 mass % cerium (III) chloride. Next, 1.75 g of the cerium (III) chloride solution and 0.859 g of propylene oxide (manufactured by TIC; ≥99.0%) were mixed to obtain an undiluted solution. In the undiluted solution, a molar ratio between Ce and propylene oxide is 1:33.0. An amount of 2.609 g of the undiluted solution was diluted with 2.37 g of ethanol (manufactured by KANTO CHEMICAL CO., INC.; 99.5%) to obtain a coating liquid. In the coating liquid, the concentration of CeCl$_3$ is 0.075 mmol/L. Subsequently, the coating liquid was aged by stirring the coating liquid all night at room temperature. The coating liquid, which was colorless and transparent, turned opaque white, brown, and then light yellow during the aging. Quadruple oxidation of at least a portion of trivalent cerium ions was confirmed by evaluation of a visible-ultraviolet absorption spectrum of the coating liquid under the aging.

A highly-transmissive glass (Optiwhite (registered trademark) manufactured by Nippon Sheet Glass Co., Ltd. and having a thickness of 3 mm) was cut into a 10 cm$^2$ piece, which was washed and dried to prepare a glass substrate. The aged coating liquid was applied to the glass substrate. The application was performed for the substrate rotating at a rotation speed of 1000 rpm using a spin coater (1H-360S manufactured by Mikasa Co., Ltd.), and the rotation was kept for 10 seconds after the application. A wet film obtained through the application of the coating liquid was washed with isopropyl alcohol, and then washed with acetone. The washed wet film was held in an electric dryer set at 60° C. to obtain a water-repellent-film-attached glass sheet.

Example 2

A water-repellent-film-attached glass sheet was obtained in the same manner as in Example 1, except that washing with a 38% ethanol solution of cyclohexene oxide (manufactured by FUJIFILM Corporation; 95%) was performed instead of washing with acetone.

Example 3

A water-repellent-film-attached glass sheet was obtained in the same manner as in Example 1, except that the molar ratio between Ce and propylene oxide in the undiluted solution of Example 1 was changed to 1:65.7.

Example 4

A CeO$_2$ film was formed on a surface of a glass substrate as used in Example 1 by magnetron sputtering using a CeO$_2$ target to obtain a water-repellent-film-attached glass sheet.

Comparative Example 1

A water-repellent-film-attached glass sheet was obtained in the same manner as in Example 1, except that the molar ratio between Ce and propylene oxide in the undiluted solution of Example 1 was changed to 1:6.7.

Comparative Example 2

A water-repellent-film-attached glass sheet was obtained in the same manner as in Example 1, except that the molar ratio between Ce and propylene oxide in the undiluted solution of Example 1 was changed to 1:0, in other words, except that propylene oxide was not added.

Comparative Example 3

A glass substrate as used in Example 1 was used as it was. That is, the glass sheet of Comparative Example 3 is a glass sheet itself and had no water-repellent film. It should be noted that the water contact angle of this Comparative Example was measured after the washed glass sheet was left in air at ordinary temperature for 20 days and after the glass sheet having undergone the above thermal treatment was left in air at ordinary temperature for 40 days.

TABLE 1

| | Ce:Epoxy (molar ratio) | Thickness (nm) | Porosity (%) | Contact angle (°) | Ra (nm) | Rzjis (nm) | Visible transmittance (%) | Visible reflectance (%) | Haze ratio (%) |
|---|---|---|---|---|---|---|---|---|---|
| Example 1 | 1:33 | 109.9 | 42 | 98.2 | 20.8 | 253.4 | 89.73 | 6.4 | 3.14 |
| Example 1 after thermal treatment | 1:33 | 61.4 | 42 | 85.7 | 5.4 | 135.5 | 86.77 | 9.7 | 2.42 |
| Example 2 | 1:33 | | 42 | 82.9 | | | | | |
| Example 2 after thermal treatment | 1:33 | | 42 | 95.1 | 25.7 | 285.0 | | | |
| Example 3 | 1:65.7 | | | 80.5 | | | | | |
| Example 4 | 1:0 | | 0 | 84.2 | 1.9 | 25.5 | | 19.1 | 0.22 |
| Example 4 | 1:0 | | 0 | 75.4 | 1.8 | 25.0 | | 18.7 | 0.25 |

TABLE 1-continued

| | Ce:Epoxy (molar ratio) | Thickness (nm) | Porosity (%) | Contact angle (°) | Ra (nm) | Rzjis (nm) | Visible transmittance (%) | Visible reflectance (%) | Haze ratio (%) |
|---|---|---|---|---|---|---|---|---|---|
| after thermal treatment | | | | | | | | | |
| Comparative Example 1 | 1:6.7 | | | 50.2 | | | | 6.3 | 7.91 |
| Comparative Example 2 | 1:0 | | | 50.2 | | | | 6.3 | 7.91 |
| Comparative Example 3 | 0 | | 0 | — | 15 | — | | | |
| Comparative Example 3 after thermal treatment | 0 | | 0 | — | 20 | — | | | |

A pink interference color was observed in Example 4, while no interference colors attributable to the water-repellent films were observed in other Examples. In Example 1, the water contact angle was less than 75° shortly after the film formation, but gradually increased thereafter. On the other hand, the contact angle measured for Example 2 had been 75° or greater since shortly after the film formation. Additionally, the water contact angle was also measured for each Working Example 100 days after the film formation and the thermal treatment. In each case, the measurement value was stable at 75° or greater. The storage until the 100th day was also performed in air at ordinary temperature.

In Examples 2 and 3, as in Example 1, absorption edges of absorption spectra of the coating liquids shifted to the long wavelength side during the aging. On the other hand, in Comparative Examples 1 and 2, shifts of absorption edges to the long wavelength side were not observed during the aging.

Figure 2:
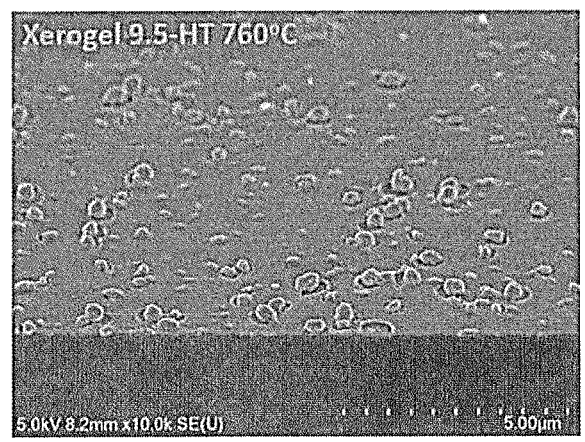
FIG. 2 shows the result of SEM observation of a water-repellent-film-attached glass article produced in Example 2.

For Examples 1 and 2, the surfaces of the water-repellent films were observed using a SEM after the thermal treatment. FIGS. 1 and 2 show the results. The surfaces of the water-repellent films were substantially flat, but fine cerium oxide particles on the surfaces provided small irregularities. A larger number of fine cerium oxide particles is confirmed on the film surface of Example 2 (FIG. 2).

A crystallite size of cerium oxide after the thermal treatment was measured by an X-ray diffraction method. The crystallite size was 4.85 nm for Example 1, and 2.10 nm for Example 2. It is thought that in Example 2, the epoxy-containing organic compound (cyclohexene oxide) added hindered growth of crystallites.

The invention claimed is:

1. A water-repellent-film-attached glass article comprising:
    a glass substrate; and
    a water-repellent film on the glass substrate, wherein
    the water-repellent film includes cerium oxide as a main component of the water-repellent film,
    the water-repellent film has a surface on which the cerium oxide is exposed,
    a porosity of the water-repellent film is 40% or more,
    a visible reflectance for visible light incident on the glass article from a side on which the water-repellent film is arranged is 10% or less,
    a contact angle of water on the surface of the water-repellent film is 75° or greater, and
    the contact angle is 75° or greater after the glass article is exposed to a thermal treatment at 760° C. for 4 minutes.

2. The water-repellent-film-attached glass article according to claim 1, wherein the porosity of the water-repellent film is 40% to 85%.

3. The water-repellent-film-attached glass article according to claim 1, wherein an arithmetic mean roughness Ra of the surface of the water-repellent film is 1 to 50 nm, where Ra is an arithmetic mean roughness defined in Japanese Industrial Standards (JIS) B 0601: 2013, and
    a ten-point mean roughness RzJIS of the surface of the water-repellent film is 20 to 500 nm, where RzJIS is a ten-point mean roughness defined in JIS B 0601:2001.

4. The water-repellent-film-attached glass article according to claim 3, wherein
    the arithmetic mean roughness Ra is 3 to 30 nm, and
    the ten-point mean roughness RzJIS is 100 to 500 nm.

5. The water-repellent-film-attached glass article according to claim 1, wherein
    a visible transmittance is 80% to 95%,
    a haze ratio is 5% or less, and
    a visible reflectance for visible light incident on the glass article from a side on which the water-repellent film is arranged is 2% to 10%.

6. The water-repellent-film-attached glass article according to claim 5, wherein
    the visible transmittance is 85% to 95%,
    the haze ratio is 4% or less, and
    the visible reflectance for the visible light incident on the glass article from the side on which the water-repellent film is arranged is 2% to 8%.

7. The water-repellent-film-attached glass article according to claim 1, wherein
    a thickness of the water-repellent film is 10 to 200 nm.

8. The water-repellent-film-attached glass article according to claim 1, wherein
    the water-repellent film further includes an organic group, and
    the organic group includes an epoxy group.

9. The water-repellent-film-attached glass article according to claim 1, wherein the cerium oxide includes $CeO_2$.

10. The water-repellent-film-attached glass article according to claim 1, wherein the cerium oxide includes both $CeO_2$ and $Ce_2O_3$.

11. The water-repellent-film-attached glass article according to claim 1, wherein the water-repellent film includes the surface being substantially flat and a plurality of fine cerium oxide particles on the surface.

12. The water-repellent-film-attached glass article according to claim 1, wherein the glass substrate is a glass sheet subjected to at least one treatment selected from the group consisting of a heat bending treatment and a thermal tempering treatment.

13. The water-repellent-film-attached glass article according to claim 12, having the water-repellent film on at least one principal surface of the glass sheet and not having the water-repellent film on an edge face of the glass sheet.

* * * * *